United States Patent [19]
Matsubayashi et al.

[11] Patent Number: 6,103,411
[45] Date of Patent: Aug. 15, 2000

[54] HYDROGEN PRODUCTION APPARATUS AND METHOD OPERABLE WITHOUT SUPPLY OF STEAM AND SUITABLE FOR FUEL CELL SYSTEMS

[75] Inventors: Takaaki Matsubayashi; Katsuya Oda, both of Moriguchi; Yasuo Miyake, Noriguchi, all of Japan

[73] Assignee: Sanyo Electric Co., Ltd., Osaka, Japan

[21] Appl. No.: 09/084,512

[22] Filed: May 26, 1998

[30] Foreign Application Priority Data

May 27, 1997 [JP] Japan ..................... 9-136264

[51] Int. Cl.[7] ............... H01M 8/04; H01M 8/18; H01M 2/00
[52] U.S. Cl. ............... 429/17; 429/19; 429/20; 429/26; 429/34
[58] Field of Search ............... 429/17, 19, 20, 429/26, 34

[56] References Cited

U.S. PATENT DOCUMENTS

| | | | |
|---|---|---|---|
| 4,522,894 | 6/1985 | Hwang et al. | 429/17 |
| 4,539,267 | 9/1985 | Sederquist | 429/17 |
| 5,302,470 | 4/1994 | Okada et al. | 429/17 |
| 5,360,679 | 11/1994 | Buswell et al. | 429/19 |
| 5,382,478 | 1/1995 | Chow et al. | 429/26 |

FOREIGN PATENT DOCUMENTS

| | | |
|---|---|---|
| 1-264903 | 10/1989 | Japan . |
| 5-186201 | 7/1993 | Japan . |
| 7-335238 | 12/1995 | Japan . |

OTHER PUBLICATIONS

Houghtby et al., "Development of the Adiabatic Reformer to Process No. 2 Fuel Oil and Coal–Derived Liquid Fuels", Report, EPRI–EM–1701, pp. 1–82, 1981 abstract only and no month available.

*Primary Examiner*—Kathryn Gorgos
*Assistant Examiner*—Edna Wong
*Attorney, Agent, or Firm*—Merchant & Gould P.C.

[57] ABSTRACT

A hydrogen production apparatus is disclosed which operates based on a steam reforming method and operates without supply of steam from outside. The hydrogen production apparatus humidifies air by allowing air to contact with warm water to generate a mixture of air and steam, mixes the mixture with a hydrocarbon fuel. Alternatively, the hydrogen production apparatus humidifies a mixture of a hydrocarbon fuel and air by allowing the mixture to contact with warm water to generate a mixed gas of the hydrocarbon fuel, air, and steam. The hydrogen production apparatus then allows air to partially oxidize the hydrocarbon fuel and allows the steam to reform the hydrocarbon fuel, resulting in the production of hydrogen.

16 Claims, 7 Drawing Sheets

HYDROGEN PRODUCTION APPARATUS AND METHOD OPERABLE WITHOUT SUPPLY OF STEAM AND SUITABLE FOR FUEL CELL SYSTEMS

BACKGROUND OF THE INVENTION (1) Field of the Invention

This invention relates to a hydrogen production apparatus and a hydrogen production method for producing hydrogen by performing partial oxidization and steam reforming on a hydrocarbon fuel such as natural gas, methanol, or naphtha, and also relates to a fuel cell system for generating electricity using hydrogen produced with the hydrogen production apparatus or the hydrogen production method.

(2) Description of the Prior Art

What is called steam reforming method is widely used in hydrogen production apparatuses which produce hydrogen and supply the produced hydrogen to fuel cells as the fuel. In the steam reforming method, a fuel such as natural gas, methanol, or naphtha is mixed with steam, then the mixture is reformed to a hydrogen-rich gas in the presence of a catalyst. Chemical Formula 1 below shows the reaction occurring in such steam reforming processes, the formula dealing with a case of methane. The reforming reaction is usually induced at a high temperature in a range of about 700–800° C.

Chemical Formula 1

$$CH_4 + H_2O \rightarrow 3H_2 + CO$$

The resultant reformed gas of the above process includes an appreciable amount of carbon monoxide (several and ten percent). However, carbon monoxide reduces the catalysis capability. Therefore, before the reformed gas is supplied to fuel cells, carbon monoxide in the reformed gas is generally converted to carbon dioxide. Chemical Formula 2 below shows the CO shift reaction which occurs in a shift converter including a catalyst for the CO shift reaction. The shift converter operates at a temperature of around 180–300° C. lower than reformers.

Chemical Formula 2

$$CO + H_2O \rightarrow CO_2 + H_2$$

Incidentally, such steam reforming apparatuses may be used at home or in the open air. Accordingly, it is desirable that the steam reforming apparatuses are compact.

Phosphoric-acid type fuel cell systems have a high cell operating temperature of around 200° C. At such a high cell operating temperature, the coolant water used for cooling the fuel cell is evaporated. The steam generated in the evaporation can be used for the steam reforming. On the other hand, polymer electrolyte fuel cell systems have a low cell operating temperature of around 80° C. At such a low cell operating temperature, steam cannot be directly obtained from the coolant water.

Conventional polymer electrolyte fuel cell systems disclosed in Japanese Laid-Open Patent Nos.1-264903 and 5-186201 are provided with a reaction tank which includes a two-layered, cylinder-shaped container filled with a catalyst for the reforming. The reaction tank receives a supply of fuel and steam while it is heated by a burner.

Japanese Laid-Open Patent No.7-335238 discloses an apparatus that first mixes a material with air then partially oxidizes the mixture using a catalyst for partial oxidization. The apparatus then mixes the high-temperature fuel gas with steam then reforms the mixed gas in the presence of a catalyst. It is possible for this apparatus to use the heat, which is generated in the partial oxidization, for the steam reforming reaction.

However, such hydrogen production apparatuses based on steam reforming methods require, outside of the apparatuses, a steam supply source such as a boiler. As a result, one problem of the hydrogen production apparatuses is that they cannot run in an environment where such a steam supply source is not available.

Concerning the mixture ratio of fuel and steam, it is considered as appropriate that the steam/carbon ratio (S/C ratio) is in a range of 2.5–3.5. Conventional techniques generally use pressure controllers or flow-rate controllers to control the pressure or flow rate of steam so that the S/C ratio stays in an appropriate range. However, it is desirable to use more convenient apparatuses than conventional ones to control the S/C ratio.

SUMMARY OF THE INVENTION

It is therefore an object of the present invention to provide a hydrogen production apparatus and a hydrogen production method which are compact and operate without difficulty without supply of steam from outside.

To achieve the above object, the hydrogen production apparatus or method of the present invention humidifies an oxidizing agent by allowing the oxidizing agent to contact with warm water to generate a mixture of the oxidizing agent and steam, mixes the mixture with a hydrocarbon fuel to generate a mixed gas of the hydrocarbon fuel, the oxidizing agent, and steam. The hydrogen production apparatus then allows the oxidizing agent to partially oxidize the hydrocarbon fuel and allows the steam to reform the hydrocarbon fuel, resulting in the production of hydrogen.

Alternatively, the hydrogen production apparatus or method humidifies a mixture of a hydrocarbon fuel and an oxidizing agent by allowing the mixture to contact with warm water to generate a mixed gas of the hydrocarbon fuel, the oxidizing agent, and steam. The hydrogen production apparatus then allows the oxidizing agent to partially oxidize the hydrocarbon fuel and allows the steam to reform the hydrocarbon fuel, resulting in the production of hydrogen.

With such a construction, it is possible to generate the mixed gas of the hydrocarbon fuel, the oxidizing agent, and steam without supply of steam from outside, resulting in a hydrogen-rich reformed gas.

Also, with such a construction, it is possible to control the amount of steam included in the mixed gas without difficulty by controlling the temperature of the warm water which contacts with the mixture of the hydrocarbon fuel and the oxidizing agent.

Also, with such a construction, a reforming unit is heated by the heat generated by the partial oxidization of the fuel gas. This reduces the size of the burner used for heating the reforming unit and enables the hydrogen production apparatus to be compact.

The above object may be achieved by a fuel cell system in which a fuel cell generates electricity using hydrogen produced by the above hydrogen production apparatus. With such a construction, warm water warmed by the fuel cell can be used in the hydrogen production apparatus. This makes it easy for the hydrogen production apparatus to humidify the oxidizing agent until the steam rate is close to saturated steam at the cell operating temperature.

In the hydrogen production apparatus or method, the oxidizing agent or the mixture of the hydrocarbon fuel and the oxidizing agent may be humidified by a humidification unit which includes: water channels through which the warm water warmed by the heat exchange in the fuel cell passes; and oxidizing-agent channels (or mixture channels) through which the oxidizing agent (or the mixture of the hydrocarbon fuel and the oxidizing agent) passes, where the water channels face the oxidizing-agent channels (or mixture channels) with an osmotic plate or membrane in between. This increases the effectiveness of the process.

To achieve the above object, a fuel cell system may be provided. A fuel cell of the fuel cell system includes a lamination of a plurality of cells, where the humidification unit is inserted between each pair of cells of the plurality of cells, where the humidification unit includes: water channels through which water used for cooling each cell passes; and oxidizing-agent channels through which the oxidizing agent passes, where the water channels face the oxidizing-agent channels with an osmotic plate or an osmotic membrane in between.

It is also possible to mix the oxidizing agent drained from the cathode of the fuel cell with the fuel to generate a mixed gas of the fuel, the oxidizing agent, and steam. This is because the oxidizing agent drained from the cathode is humidified and is supplied to the hydrogen production apparatus as a mixture of the oxidizing agent and steam. The hydrogen production apparatus then allows the oxidizing agent to partially oxidize the fuel and allows the steam to reform the fuel, resulting in the production of hydrogen.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
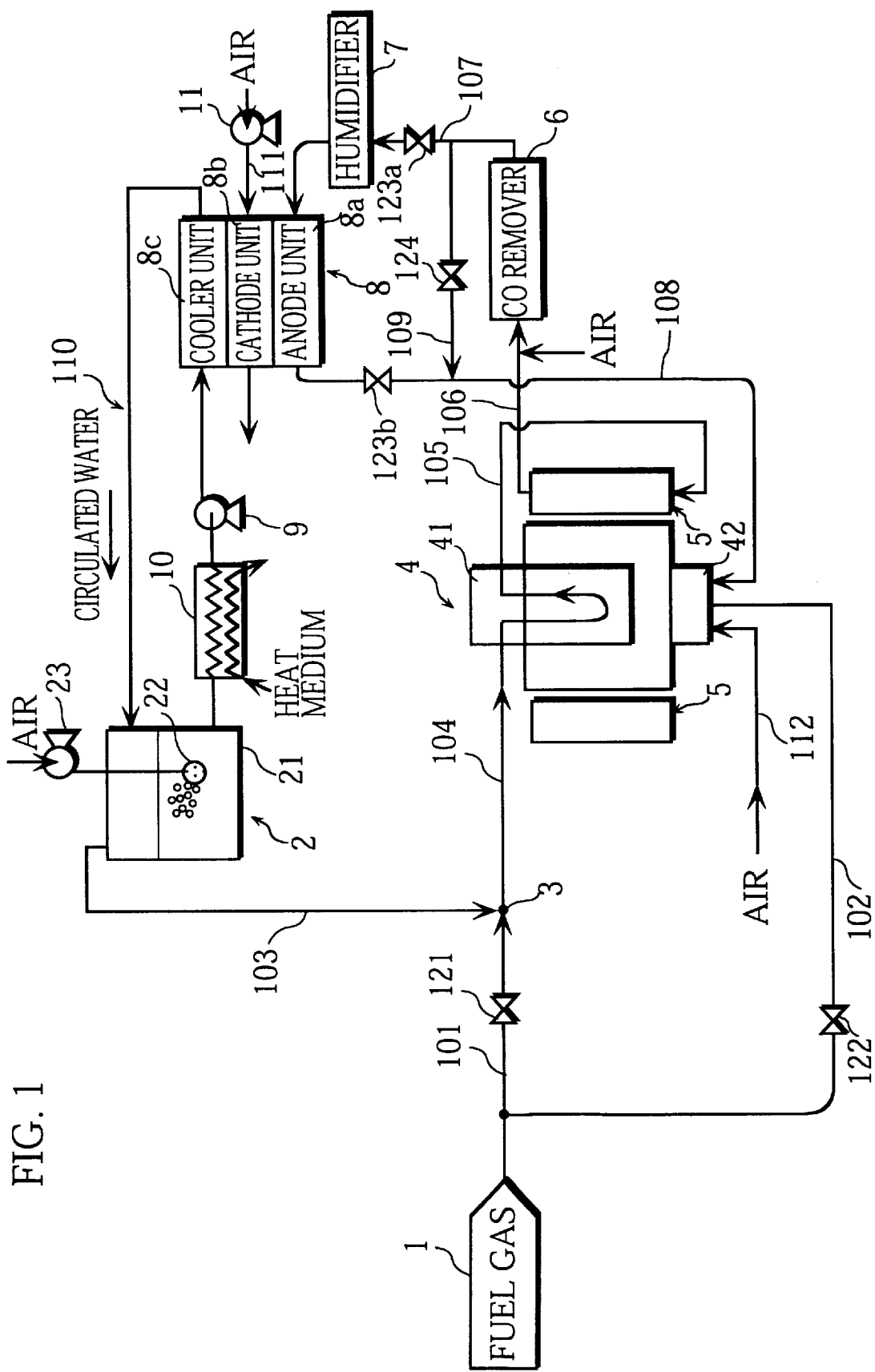
FIG. 1 shows the structure of the polymer electrolyte fuel cell system of Embodiment 1.

Several preferred embodiments of the present invention are described below with reference to the drawings.
<Embodiment 1>
Structure of Fuel Cell System FIG. 1 shows the structure of the polymer electrolyte fuel cell system of the present embodiment.

The polymer electrolyte fuel cell system is composed of a fuel gas source 1, a humidifier 2 for generating moisture by letting the air contact with warm water, a mixer 3 for generating a mixture gas of humidified air and fuel gas, a reformer 4 for generating a hydrogen-rich reformed gas by performing partial oxidation and steam reforming on the fuel gas included in the mixture gas, a shift converter 5 for performing CO shift reaction on carbon monoxide included in the reformed gas, a CO remover 6 for removing the carbon monoxide included in the reformed gas by performing selective oxidation on the carbon monoxide, a humidifier 7 for humidifying the reformed gas output from the CO remover 6, a polymer electrolyte fuel cell 8 for generating electricity using an anode unit 8a for receiving the humidified reformed gas and a cathode unit 8b for receiving air, a water pump 9 for cycling water in a cooler unit 8c of the polymer electrolyte fuel cell 8, and a heat exchanger 10 for warming and cooling the circulating water.

The fuel gas source 1 may be achieved by a liquefied petroleum gas (propane, butane, etc.) cylinder or a supplier apparatus of city gas or naphtha.

The humidifier 2 is composed of a sealed container 21 for storing warm water drained from the cooler unit 8c, a bubbler 22 set inside the sealed container 21, and an air pump 23 for sending the air into the bubbler 22. With this construction, the humidifier 2 spurts the air into the warm water to generate moisture.

Alternatively, the humidifier 2 may have a construction in which air flows on the surface of retained warm water to achieve the same.

The reformer 4 is composed of a cylinder-shaped reforming pipe 41 which is filled with a catalyst for the reforming, a burner 42 for heating the reforming pipe 41 by generating a high-temperature combustion gas. The catalyst for the reforming is used for both the partial oxidation and the steam reforming. For example, the catalyst for the reforming is composed of a catalyst support such as alumina or zirconia and an active metal such as ruthenium, platinum, or nickel, placed on the catalyst support.

The mixture gas coming out of the mixer 3 passes through the reforming pipe 41 which is kept at a high operation temperature of around 400° C. or more. This causes a partial oxidization reaction as shown in Chemical Formula 3 below, a combustion reaction as shown in Chemical Formula 4 below, and a steam reforming reaction as shown in Chemical Formulae 1 and 2 above, resulting in generation of a hydrogen-rich reformed gas. Note that the generated hydrogen-rich reformed gas includes carbon monoxide.

Chemical Formula 3

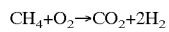

Chemical Formula 4

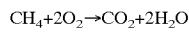

It should be noted here that the burner 42 is used to heat the reforming pipe 41 to its operating temperature (500–700° C.) in the activation, then the operating temperature is maintained by heat generated by the partial oxidization during its steady operation.

The shift converter 5, surrounding the reformer 4, is a hollow-body, cylinder-shaped container filled with a CO shift catalyst. The temperature of the shift converter 5 is maintained at around 180–250° C. by the heat received from the reformer 4. A catalyst filled in the shift converter 5 is, for example, a copper-zinc catalyst tablet. The shift converter 5 allows carbon monoxide to react with steam so that carbon monoxide is converted to carbon dioxide, which reduces the concentration of carbon monoxide in the reformed gas to around one percent (10,000 ppm).

The CO remover 6 is a cylindrical pipe. The CO remover 6 is filled with the selected oxidization catalyst. The reformed gas coming out of the shift converter 5 is mixed with a small amount of air, then entered into the CO remover 6. The CO remover 6 reduces the concentration of carbon monoxide in the reformed gas through selective oxidization of carbon monoxide.

The catalyst for selective oxidization is, for example, an alumina porous material formed like a honeycomb which holds an active metal such as ruthenium or platinum. Alternatively, the above alumina porous material may be in tablet or ball form.

A temperature in the range of around 100–200° C. is suitable for the selective oxidization. A stable selective oxidization without steam aggregation is achieved when the temperature is kept in the range.

The humidifier 7, the same as humidifier 2, may be achieved with the bubbling method or a method in which the air flows on the surface of retained warm water. The reformed gas coming out of the CO remover 6 is humidified by the humidifier 7, then sent to fuel cell 8.

Piping and Valve

As shown in FIG. 1, the fuel cell system is provided with many pipes mainly used for transferring fuel gas, the pipes including: pipe 101 for transferring fuel gas from the fuel gas source 1 to the mixer 3; pipe 102 for transferring the fuel gas from the fuel gas source 1 to the burner 42 of the reformer 4; pipe 103 for transferring the humidified air from the humidifier 2 to the mixer 3; pipe 104 for transferring the mixture gas of the fuel gas and the humidified air from the mixer 3 to the reformer 4; pipe 105 for transferring the reformed gas from the reformer 4 to the shift converter 5; pipe 106 for transferring the reformed gas from the shift converter 5 to the CO remover 6; pipe 107 for transferring the reformed gas from the CO remover 6 to the anode unit 8a of the fuel cell 8; pipe 108 for transferring the non-reacted gas from the anode unit 8a to the burner 42, and pipe 109 for directly transferring gas from the CO remover 6 to the burner 42.

The fuel cell system is also provided with pipes mainly us ed for transferring water. A pipe 110, one of such pipes, is used for cycling the water, where the water starts from the water pump 9, goes through the cooler unit 8c of the fuel cell 8, the humidifier 2, and the heat exchanger 10, and comes back to the water pump 9.

The fuel cell system is also provided with pipes mainly used for transferring air. A pipe 111, one of such pipes, is used for supplying air from an air fan 11 to the cathode unit 8b; a pipe 112 is used for supplying air to the burner 42.

The pipe 101 includes a regulating valve 121 used to adjust the flow rate of the fuel gas supplied to the reforming pipe 41, the pipe 102 a regulating valve 122 to adjust the flow rate of the fuel gas supplied to the burner 42, the pipes 107, 108, and 109 respectively switching valves 123a, 123b, and 124 to switch flows.

Operation of Fuel Cell System

Start-up

At initial stages from the start-up , the switching valves 123a and 123b are closed and switching valve 124 is opened so that gas is directly transferred from the CO remover 6 to burner 32, without passing through the fuel cell 8.

The water pump 9 is used to circulate water slowly, while the circulated water is heated with the heat exchanger 10. As the above process goes on, the temperatures of the fuel cell 8 and water of a water tank 13 also rise.

The reformer 41 is heated as the burner 42 burns the fuel gas supplied through the regulating valve 122 while simultaneously, air is supplied to the burner 42 through the pipe 112.

Air is supplied from the air pump 23 of the humidifier 2 to the bubbler 22 so that humidified air is sent to the mixer 3, while, at the same time, the regulating valve 121 is opened to send the fuel gas to the mixer 3. With this arrangement, the fuel gas is mixed with the humidified air in the mixer 3, resulting in a mixed gas of fuel gas, air, and steam. The mixed gas passes through the reforming pipe 41. The mixed gas warmed by the reforming pipe 41 warms the shift converter 5 and the CO remover 6 in turn as it passes through them. The mixed gas eventually enters the burner 42 and is burned there. When the temperature reaches around 400° C. in the reforming pipe 41, the partial oxidization and the steam reforming start in the reforming pipe 41 to generate a hydrogen-rich gas.

Furthermore, after the temperatures of the shift converter 5 and the CO remover 6 reach to respective operating temperatures, a hydrogen-rich gas with low concentration of carbon monoxide is generated. When this happens, the switching valve 124 is closed and the switching valves 123a and 123b are opened so that the hydrogen-rich gas is supplied to the anode unit 8a of the fuel cell 8. At the same time, the air fan 11 starts supplying air to the cathode unit 8a.

This allows the fuel cell 8 to generate electricity. The fuel cell 8 warms itself as it generates electricity. On reaching a certain running temperature (around 80° C.), the fuel cell 8 begins the normal operation.

Normal Operation

During the normal operation, the fuel cell 8 supplies electricity to an external load (not shown in the drawings). Also, the heat exchanger 10 cools the circulated water. The cell operating temperature of the fuel cell 8, which is warmed as it generates electricity, is kept at a certain temperature. This is because the circulated water is cooled by the heat exchanger 10 and then sent to the cooler unit 8c by the water pump 9. The sealed container 21 of the humidifier 2 stores warm water drained from the fuel cell 8. Accordingly, the temperature of the water is close to the cell operating temperature of the fuel cell 8. The air sent from the air pump 23 is well humidified in the sealed container 21 by contacting well with the water in the container. Therefore, the humidified air sent to the mixer 3 is close to saturated steam at the cell operating temperature (80° C.).

Also, during the normal operation, the regulating valve 122 is closed and only the unreacting gas drained from the anode unit 8a is burned by the burner 42.

The flow rates of ,the humidified air and the fuel gas sent to the mixer 3 are respectively controlled by adjusting the output of the air pump 23 and the level of opening the regulating valve 121. A steady amount of steam is sent in proportion to the flow rate of the air pump 23 since the humidified air sent to the mixer 3 is almost equal to the saturated steam at the cell operating temperature, as stated above.

The amount of fuel gas burned in the reforming pipe 41 and the temperature of the reforming pipe 41 increase as the ratio of the humidified air to the fuel gas increases. It is desirable that the flow rates of the humidified air and the fuel gas are set so that the temperature of the reforming pipe 41 is kept in the range of 500–700° C. and the S/C ratio of the mixed gas generated by the mixer 3 is in the range of 2.0–3.0.

During the operation, a water supplier (not shown in the drawings) supplies water used for humidifying air to the sealed container 21.

To humidify the polymer electrolyte membrane of the fuel cell 8 better, a humidifier may be attached to the pipe 111 to humidify the air output from the air fan 11 and supply the humidified air to the cathode unit 8b, in addition to the humidifier 7 for humidifying reformed gas and supplying the humidified gas to the anode unit 8a.

<Embodiment 2>

Figure 2:
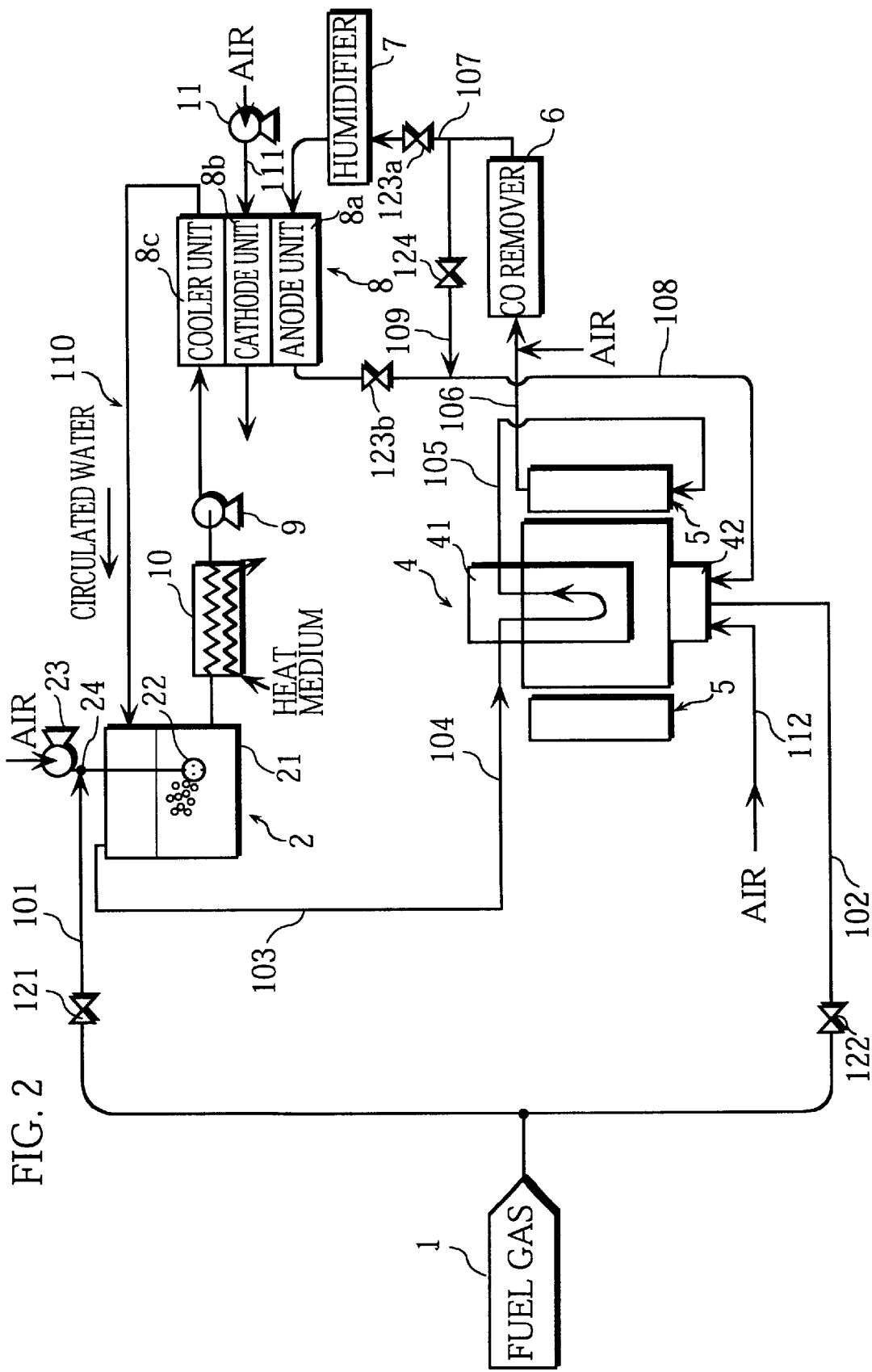
FIG. 2 shows the structure of the polymer electrolyte fuel cell system of Embodiment 2.

FIG. 2 shows the structure of the polymer electrolyte fuel cell system of the present embodiment.

The polymer electrolyte fuel cell system of the present embodiment humidifies a mixture of fuel gas and air with warm water, while Embodiment 1 mixes fuel gas with air having been humidified by warm water.

The construction of the polymer electrolyte fuel cell system of the present embodiment is equal to that of Embodiment 1 except that the mixer 3 is removed and that a mixer 24 is set between the air pump 23 and the bubbler 22 to mix fuel gas with air. With this construction, the mixture of fuel gas and air is sent to the reformer 4 after it is humidified with warm water.

With the method of the present embodiment, the mixed gas includes more steam, that is, higher S/C ratio is obtained than Embodiment 1 if the humidification temperature and the mixture ratio of fuel gas and air are the same.

The condition for running the fuel cell system of the present embodiment is theoretically considered as follows.

Table 1 below shows the air/fuel ratio and S/C ratio for each fuel, methane (CH4), propane (C3H8), and butane (C4H10). The S/C ratio corresponds to each mixture gas of the fuel, air, and steam. The mixture gas was obtained by mixing the fuel with air with the air/fuel ratio shown in the table and by humidifying the mixture until the dew point is 80° C.

TABLE 1

| FUEL GAS | METHANE $CH_4$ | | PROPANE $C_3H_8$ | | BUTANE $C_4H_{10}$ | |
|---|---|---|---|---|---|---|
| AIR/FUEL RATIO | 1.3 | 1.8 | 6 | 7.5 | 8 | 10.5 |
| S/C RATIO | 2 | 2.5 | 2 | 2.5 | 2 | 2.5 |
| DEW POINT (° C.) | | | 80 | | | |
| REFORMED GAS COMPOSITION (%) | | | | | | |
| $H_2$ | 46.3 | 39.3 | 33.6 | 27.8 | 32.8 | 26.0 |
| CO | 9.9 | 7.2 | 8.3 | 5.7 | 8.2 | 5.4 |
| $CO_2$ | 6.5 | 7.2 | 8.6 | 9.0 | 8.9 | 9.3 |
| $CH_4$ | 0.4 | 0.1 | 0.1 | 0.0 | 0.1 | 0.0 |
| $N_2$ | 17.2 | 20.6 | 26.8 | 29.0 | 27.2 | 30.4 |
| $H_2O$ | 19.8 | 25.6 | 22.7 | 28.5 | 22.9 | 28.9 |
| TEMPERATURE (° C.) | | | 700 | | | |

It is understood from the above Table 1 that mixture gases with S/C ratio being in the range of 2–2.5 are obtained with the system of Embodiment 2 when the air/fuel ratio is set as shown in Table 1.

Also, the compositions of the reformed gases obtained by reforming the mixture gases were also calculated.

In this calculation, it was assumed that the partial oxidization reaction progresses until all the oxygen included in the air in the mixture gas is consumed, and that the following steam reforming reaction progresses until it is in the equilibrium state at 700° C. Note that the above reactions with methane are shown in Formulae 1 and 2. However, for propane or butane, a sub reaction was taken into account in which methane is generated due to decomposition of the fuel. Table 1 shows the compositions of the reformed gases obtained from the calculation.

As apparent from Table 1, each mixture gas turns into a hydrogen-rich reformed gas with the composition as shown in Table 1 by passing through the reforming apparatus.

Also, it is apparent that the ratio of nitrogen in the reformed gas increases as the air/fuel ratio increases.

Also, it is apparent that with the increase of the air/fuel ratio, the S/C ratio and the ratios of water in the reformed gas increase, but the ratios of hydrogen and carbon monoxide in the reformed gas decrease.

<Embodiment 3>

Figure 3:
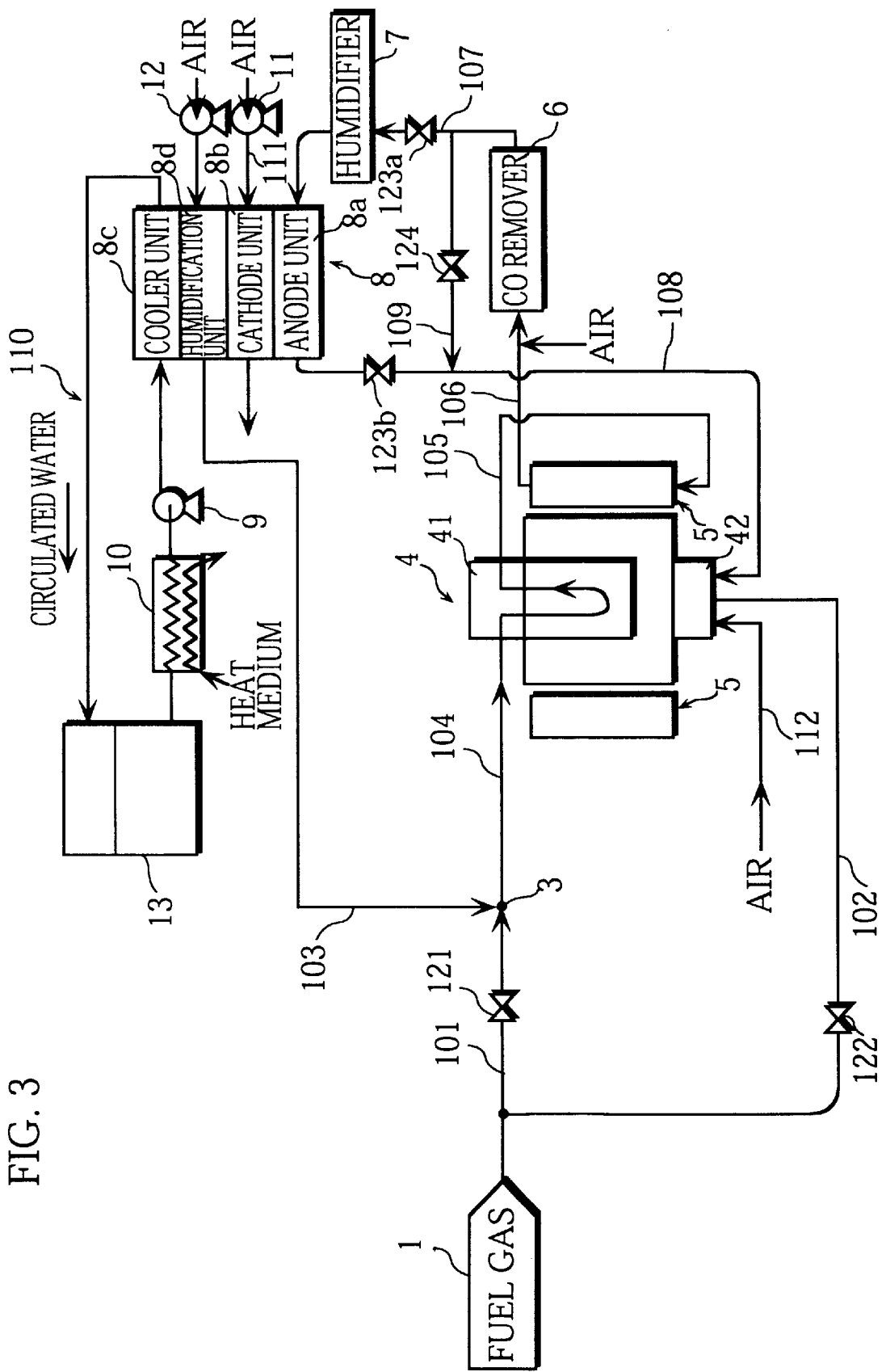
FIG. 3 shows the structure of the polymer electrolyte fuel cell system of Embodiment 3.

FIG. 3 shows the structure of the polymer electrolyte fuel cell system of the present embodiment.

The construction of the polymer electrolyte fuel cell system of the present embodiment is equal to that of Embodiment 1 except that the humidifier 2 is removed and that a humidification unit 8d for humidifying air is set in the fuel cell 8. With this construction, air is sent from the air pump 12 to the humidification unit 8d. The air is humidified by the humidification unit 8d, then is mixed with a fuel gas in the mixer 3. The mixed gas is sent to the reformer 4.

Figure 4:
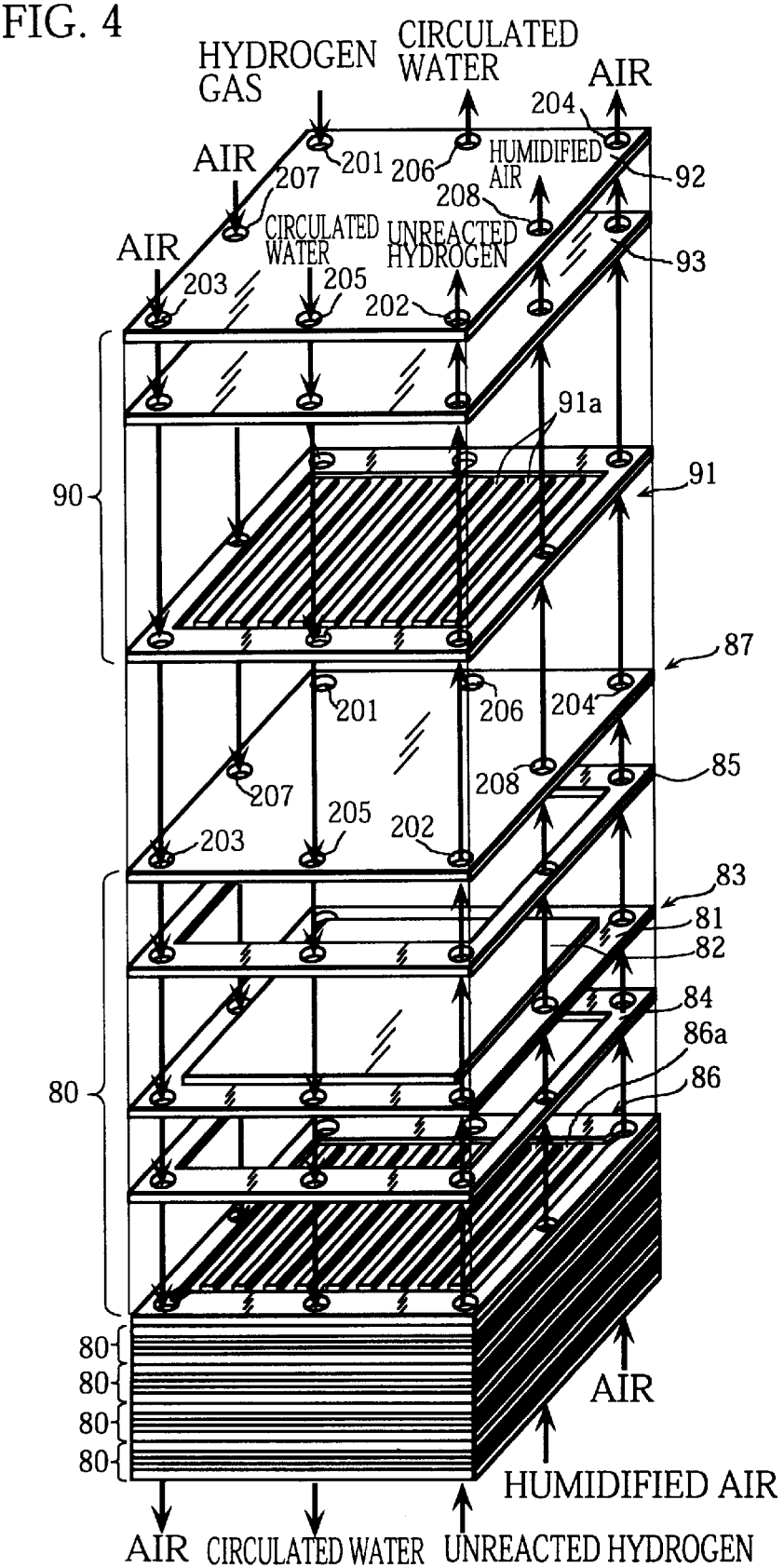
FIG. 4 is a perspective illustration showing a part of the fuel cell of Embodiment 3.

FIG. 4 is a perspective illustration showing a part of the fuel cell 8 in which the humidification unit 8d is loaded.

The fuel cell 8 of the present embodiment is composed of a plurality of lamination units one of which is shown in FIG. 4. Each lamination unit is composed of a certain number of laminated cell units 80 (FIG. 4 shows a lamination unit including five cell units 80) and a cooling-humidification unit 90.

Each cell unit 80 includes: a cell 83 consisting of a polymer electrolyte membrane 81 on respective surfaces of which an anode 82 and a cathode (not shown in the drawing) are formed; a half plate 86 on which cathode gas channels 86a are formed; a half plate 87 on which anode gas channels (not shown in the drawing) are formed; a gasket 84 which is inserted between the cathode gas channels 86a and the cathode; and a gasket 85 which is inserted between the anode gas channels and the anode 82.

The cooling-humidification unit 90 consists of a lamination of: a coolant plate 91 on which coolant channels 91a are formed to transfer coolant water; and an air plate 92 on which air channels are formed to transfer air; and an osmotic plate 93 which is inserted between the coolant channels 91a and the air channels. The air passing through the air channels of the air plate 92 is humidified by the warm water having come from the coolant channels 91a through the osmotic plate 93, resulting in a mixture of air and steam.

The osmotic plate 93 is made of a material which allows water to pass through itself and has electroconductivity. Such materials are, for example, a porous carbon plate and a porous metal plate.

Note that in FIG. 4, the air channels are hidden behind the air plate 92.

Each component of the cell unit 80 and the cooling-humidification unit 90 has in its surrounding part: manifold holes 201 and 202 used for supplying/draining the hydrogen-rich gas to/from the anode gas channels; manifold holes 203 and 204 used for supplying/draining air to/from the cathode gas channels 86a; manifold holes 205 and 206 used for supplying/draining water to/from the coolant channels 91a; a manifold hole 205 used for supplying/draining water to/from the coolant channels 91a; and manifold holes 207 and 208 used for supplying/draining air to/from the air channels of the air plate 92.

During normal operations, the circulated water coming out of the water tank 13 is cooled by the heat exchanger 10. The cooled water is sent to the cooler unit 8c of the fuel cell 8 via the water pump 9. The air pump 12 sends air to the humidification unit 8d (refer to FIG. 3).

FIG. 4 shows an example in which the circulated water coming out of the cooler unit 8c is supplied through the manifold hole 205 to the coolant channels 91a. The supplied water cools the fuel cell 8, while the water itself is warmed.

A part of the warmed water passes through the osmotic plate 93 and reaches the air channels of the air plate 92, humidifies air in the air channels, and is drained through the manifold hole 206.

In FIG. 4, the air sent to the humidification unit 8d is supplied through the manifold hole 207 to the air channels of the air plate 92. The air is humidified by the warm water coming from the coolant channels 91a passing through the osmotic plate 93. The humidified air is drained from the manifold hole 208.

The circulated water drained from the fuel cell 8 is sent through the pipe 110 to the water tank 13. The humidified air drained from the fuel cell 8 is mixed with the fuel gas in the mixer 8. The mixture gas generated in the mixer 3 is, as in the system of Embodiment 1, reformed to a hydrogen-rich gas. The hydrogen-rich gas is supplied to the anode unit 8a of the fuel cell 8.

<Embodiment 4>

Figure 5:
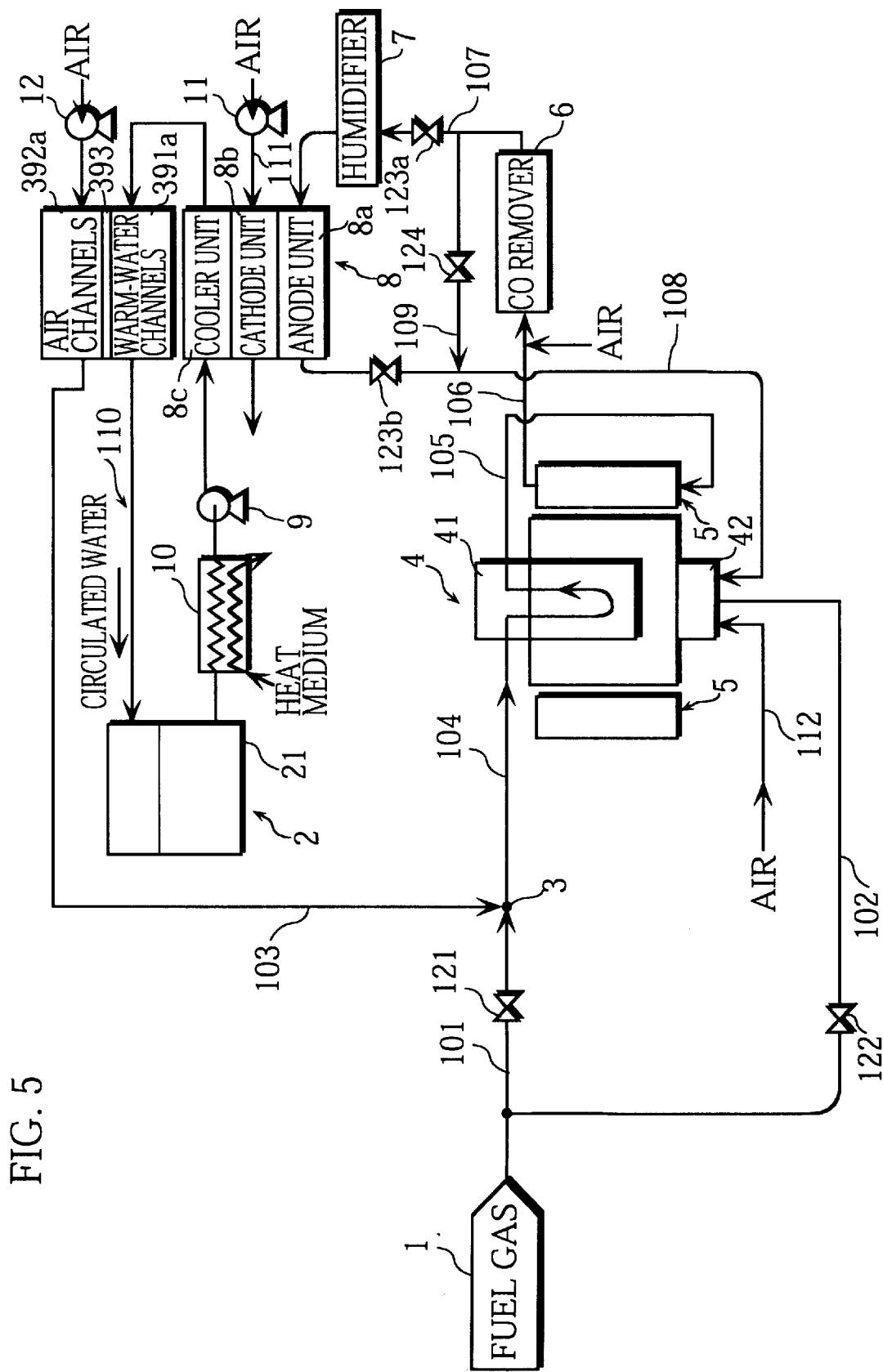
FIG. 5 shows the structure of the polymer electrolyte fuel cell system of Embodiment 4

FIG. 5 shows the structure of the polymer electrolyte fuel cell system of the present embodiment.

The polymer electrolyte fuel cell system of the present embodiment has the same construction as that of Embodiment 1 except that the humidifier 2 of the bubbling type is removed and that a humidifier 300 including an osmotic plate is used. The osmotic plate is made of, for example, a porous carbon plate, a porous metal plate, and a water-penetrative membrane (e.g., a thin film of perfluorocarbon sulphonic acid).

Figure 6:
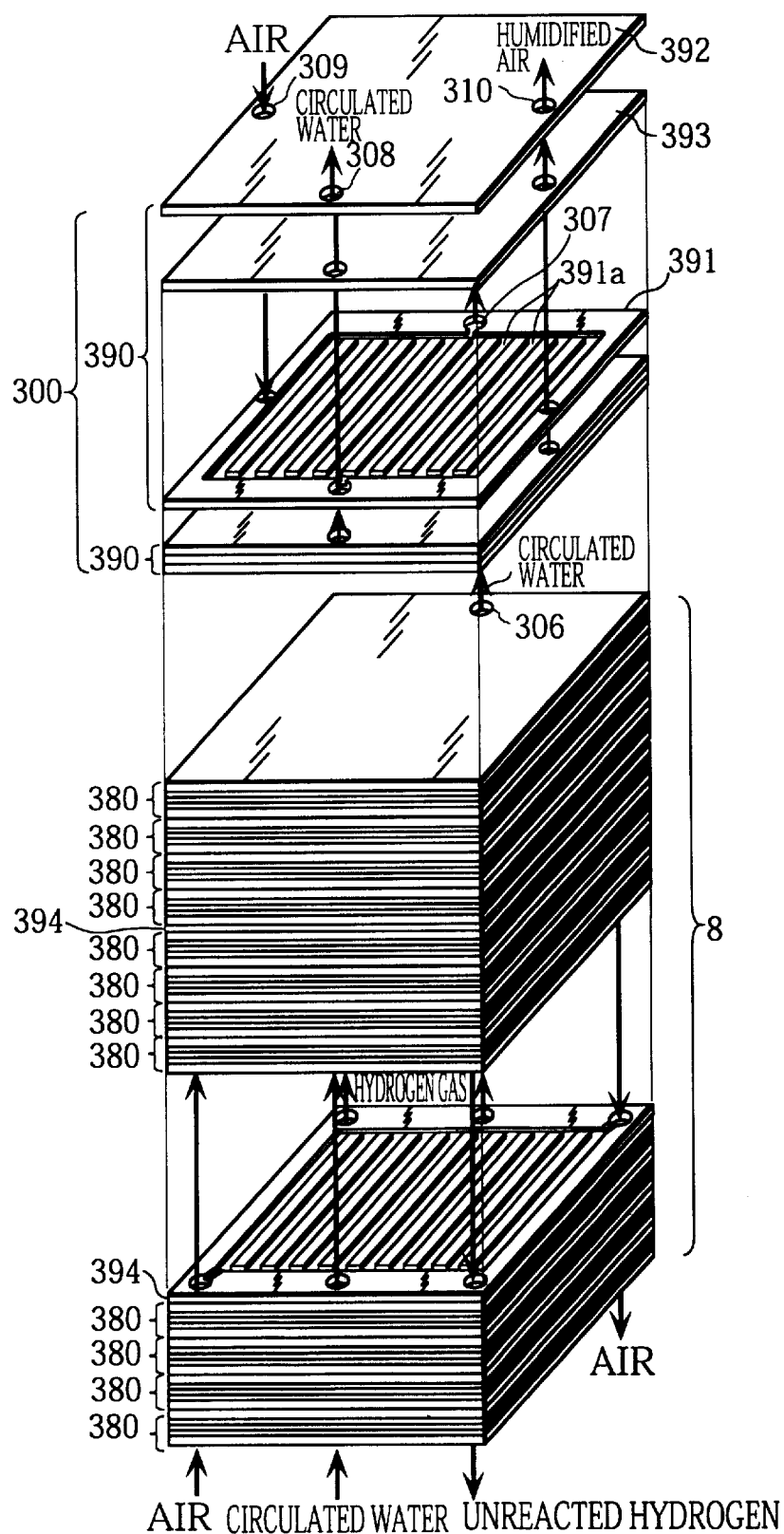
FIG. 6 is a perspective illustration showing the fuel cell and the humidifier of Embodiment 4.

Also, as shown in FIG. 6, the fuel cell 8 of the present embodiment is a lamination of cell units 380. One coolant plate 394 is inserted in this lamination per a certain number of cell units 380 (FIG. 6 shows a case in which the number of the cell units 380 is four).

The cell unit 380 and the coolant plate 394 respectively have the same construction as the cell unit 80 and the coolant plate 91 shown in FIG. 4 except that they do not have manifold holes 207 and 208 for transferring air (humidified air).

The humidifier 300 is composed of one or more laminated humidification units 390 (FIG. 6 shows a case of two humidification units 390). The humidifier 300 is placed on the fuel cell 8 to be integral with it. Each humidification unit 390 has the same construction as the cooling-humidification unit 90 of Embodiment 3, consisting of a lamination of: a warm-water plate 391 on which warm-water channels 391a are formed to transfer warm water; and an air plate 392 on which air channels 392a (not shown in FIG. 6) are formed to transfer air; and an osmotic plate 393 which is inserted between the warm-water channels 391a and the air channels 392a, where the warm-water channels 391a and the air channels 392a face each other with an osmotic plate 393 in between.

In the above integration of the fuel cell 8 with the humidifier 300, the water circulating through the fuel cell 8 is warmed when passing through the coolant plate 394. The warmed water enters the humidifier 300 through manifold holes 306 and 307. The warmed water then passes through the warm-water channels 391a, is drained from the manifold hole 308, and is sent through the pipe 110 to the water tank 13. A part of the warmed water passing through the warm-water channels 391a penetrates the osmotic plate 93 to the air channels 392a.

Air pump 12,sends air to the humidifier 300 through the manifold hole 309. The air is humidified as it passes through the air channels 392a by the warmed water which comes through the osmotic plate 393. The humidified air is drained from the manifold hole 310 and is transferred to the mixer 3 through the pipe 103, where the air is mixed with the fuel gas. The mixed gas is sent to the reformer 4.

As apparent from the above description, the polymer electrolyte fuel cell system of the present embodiment has a smaller size than that of Embodiment 1 since it is an integration of the fuel cell 8 with the humidifier 300. This construction also enables heat to be directly transmitted from the fuel cell 8 to the humidifier 300, resulting in an effective heat exchange.

Also, the structure, in which warmed water moves from the fuel cell 8 to the humidifier 300 through manifold holes 306 and 307, relieves the necessity of attaching a pipe to the system to transmit the warmed water. This also makes the system size smaller.

In the present embodiment, the polymer electrolyte fuel cell system of Embodiment 1 is used by replacing the humidifier 2 with the humidifier 300. However, it is also possible to use the system of Embodiment 2 by replacing the humidifier 2 with the humidifier 300.

<Embodiment 5>

Figure 7:
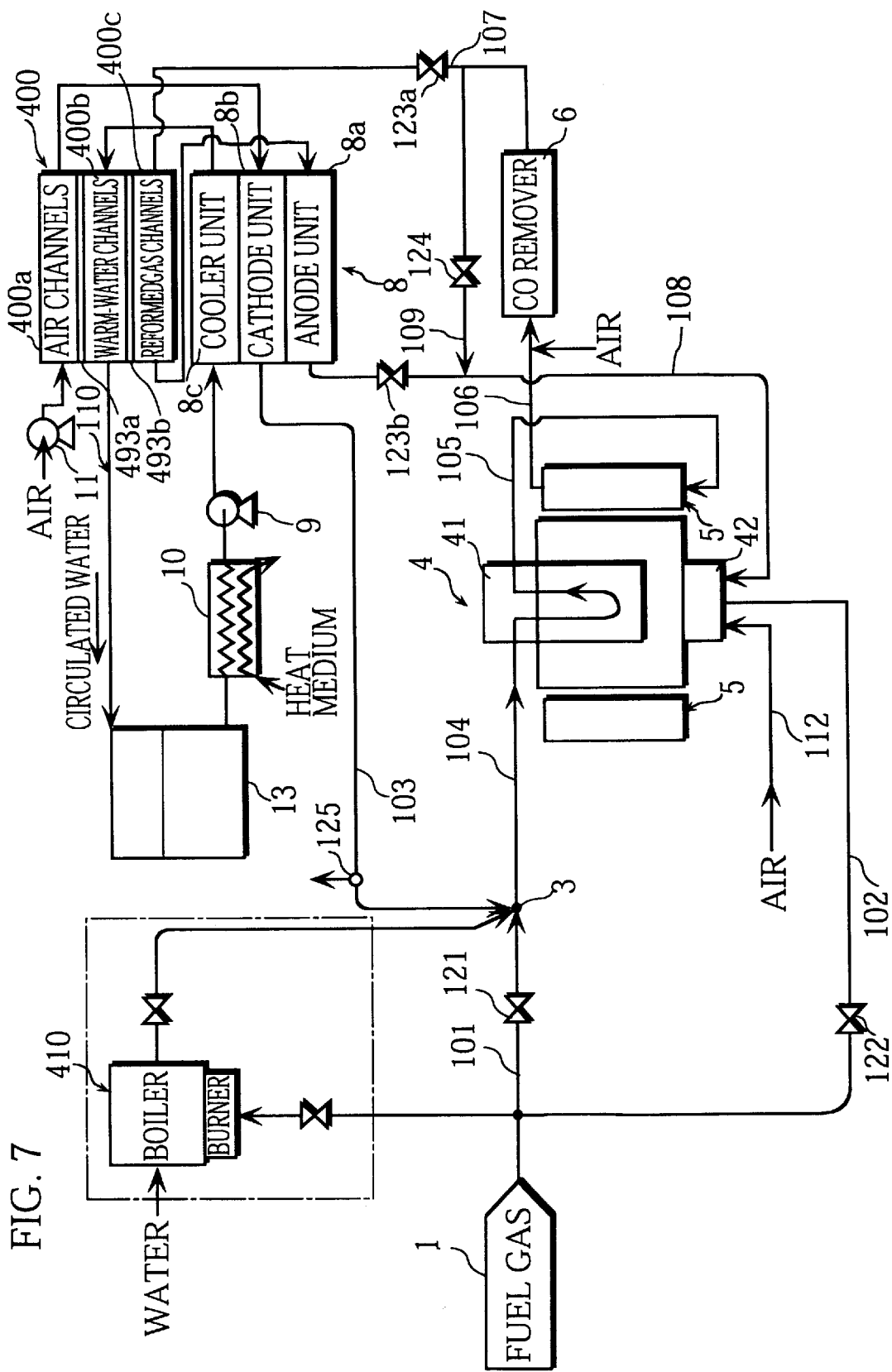
FIG. 7 shows the structure of the polymer electrolyte fuel cell system of Embodiment 5.

FIG. 7 shows the structure of the polymer electrolyte fuel cell system of the present embodiment.

The polymer electrolyte fuel cell system of the present embodiment has the same construction as that of Embodiment 1 except that it includes a humidifier 400 which humidifies both air and the reformed gas, while in Embodiment 1, the air from the air pump 12 and the reformed gas are respectively humidified by the humidifier 2 and the humidifier 7.

The humidifier 400 is constructed so that air channels 400a face warm-water channels 400b and also face the reformed-gas channels 400c with osmotic plates 493a and 493b in between, respectively.

The humidifier 400, as described above, is composed of an air humidification unit and a reformed-gas humidification unit. The humidifier 400 may include a desired number of air humidification units or reformed-gas humidification units. Also, the humidifier 400, as the humidifier 300 of Embodiment 4, may be placed on the fuel cell 8 to be integral with it.

As apparent from the above description, the polymer electrolyte fuel cell system of the present embodiment has a smaller size than those of previous Embodiments since it is possible for one humidifier 400 to humidify both air and the reformed gas.

In Embodiment 1, the air fan 11 sends air to the cathode unit 8b and the air pump 23 sends air to the humidifier 2. In the preset embodiment, the air coming out of the air fan 11 is humidified in the humidifier 400. The humidified air is sent to the cathode unit 8b to be used in generation of electricity. The air drained from the cathode unit 8b is sent to the mixer 3 as an oxidizing agent, where the air is mixed with the fuel gas.

The cathode unit 8b consumes a part of the oxygen contained in the air passing through the unit 8b when generating electricity. Accordingly, the ratio of oxygen in the air drained from the cathode unit 8b is lower than that in the atmospheric air; the ratio of nitrogen in the air drained from the cathode unit 8b is higher than that in the atmospheric air. None the less, the air drained from the cathode unit 8b is enough to be used as an oxidizing agent to partly oxidize the fuel gas.

The cathode unit 8b of the fuel cell 8 generates water when generating electricity and uses the generated water to humidify air passing through the unit 8b. As a result, the mixer 3 receives a humidified air (a mixture of air and steam) which has been humidified by both the humidifier 400 and the cathode unit 8b of the fuel cell 8.

Incidentally, the amount of the air drained from the cathode unit 8b is well over an amount of air required by the mixer 3 to be mixed with the fuel gas. Accordingly, in the present embodiment, a distribution valve 125 is formed on the pipe 103 between the cathode unit 8b and the mixer 3. The distribution valve 125 is adjusted so that only an appropriate amount of air is sent to the mixer 3 and the rest is discharged to outside.

It is desirable to form an air pump between the distribution valve 125 and the mixer 3 to send a stable amount of air to the mixer 3. However, this will be achieved without forming such an air pump if the mixer 3 is made of an ejector which breathes in the air drained from the distribution valve 125.

In the present embodiment, the air humidified by the humidifier 400 is sent to the mixer 3 via the cathode unit 8b of the fuel cell 8. However, non-humidified air may also be sent to the mixer 3 via the cathode unit 8b. This will not disturb the operation of the system.

A boiler 410 for generating steam may be added to the fuel cell system of the present embodiment, as shown in a section surrounded by the center line in FIG. 7. The steam generated in the boiler 410 is sent to the mixer 3, where the steam is mixed with the fuel gas supplied from the fuel gas source 1. That is to say, the mixer 3 may receive both steam and humidified air to mix them with the fuel gas.

Others

In Embodiments 1 and 2, the sealed container 21 of the humidifier 2 stores the circulated water coming out of the cooler unit 8c so that the temperature of the sealed container 21 is automatically kept to be close to the cell operating temperature of the fuel cell 8. However, a heater may be attached to the sealed container 21 to heat the water retained in the container 21.

In the above embodiments, the reformer 4 includes the reforming pipe 41 which is filled with a reforming catalyst and the reforming catalyst is used for both the partial oxidization and the steam reforming. However, it is possible to separately form a partial oxidization catalyst layer filled with a reforming catalyst for the partial oxidization and a steam reforming catalyst layer filled with a reforming catalyst for the steam reforming so that the mixed gas passes through first the partial oxidization catalyst layer and then the steam reforming catalyst layer.

The above embodiments disclose examples of polymer electrolyte fuel cell systems in which a hydrogen-rich gas coming out of the reformer 4 passes through a CO remover and a humidifier before being supplied to a polymer electrolyte fuel cell. However, the present invention is not limited to the polymer electrolyte fuel cell systems, but is applicable to general fuel cell systems.

Note that for phosphoric-acid type fuel cell systems, CO removers or humidifiers are not required.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A hydrogen production apparatus for generating hydrogen, the hydrogen production apparatus comprising:

humidification means for humidifying an oxidizing agent by allowing the oxidizing agent to contact with liquid warm water so that a steam content of the oxidizing agent is close to saturated steam at an operating temperature of the apparatus;

mixing means for mixing the oxidizing agent humidified by the humidification means with a hydrocarbon fuel to generate a mixed gas of the hydrocarbon fuel, the oxidizing agent, and steam; and reforming means for allowing the oxidizing agent to partially oxidize the hydrocarbon fuel and allowing the steam to reform the hydrocarbon fuel.

2. A hydrogen production apparatus for generating hydrogen, the hydrogen production apparatus comprising:

humidification means for humidifying a mixture of a hydrocarbon fuel and an oxidizing agent by allowing the mixture to contact with liquid warm water to generate a mixed gas of the hydrocarbon fuel, the oxidizing agent, and steam so that a steam content of the oxidizing agent is close to saturated steam at an operating temperature of the apparatus; and reforming means for allowing the oxidizing agent to partially oxidize the hydrocarbon fuel and allowing the steam to reform the hydrocarbon fuel.

3. A fuel cell system comprising:

a hydrogen production apparatus for generating hydrogen, the hydrogen production apparatus including: humidification means for humidifying an oxidizing agent by allowing the oxidizing agent to contact with liquid warm water so that a steam content of the oxidizing agent is close to saturated steam at an operating temperature of the apparatus;

mixing means for mixing the oxidizing agent humidified by the humidification means with a hydrocarbon fuel to generate a mixed gas of the hydrocarbon fuel, the oxidizing agent, and steam; and reforming means for allowing the oxidizing agent to partially oxidize the hydrocarbon fuel and allowing the steam to reform the hydrocarbon fuel; and a fuel cell for generating electricity using the hydrogen generated by the hydrogen production apparatus, the fuel cell including at least one cell, wherein each cell is a lamination of an anode and a cathode with an electrolyte membrane in between.

4. The fuel cell system of claim 3, wherein
the warm water used by the humidification means is warmed by a heat exchange which occurs in the fuel cell.

5. The fuel cell system of claim 4, wherein
the humidification means is thermally integrated with the fuel cell, the humidification means being adjacent to the fuel cell.

6. The fuel cell system of claim 4, wherein
the humidification means includes:
one or more water channels through which the warm water warmed by the heat exchange in the fuel cell passes; and
one or more oxidizing-agent channels through which the oxidizing agent passes, wherein
the water channels face the oxidizing-agent channels with one of an osmotic plate or an osmotic membrane in between.

7. The fuel cell system of claim 6, wherein
the humidification means is thermally integrated with the fuel cell, the humidification means being adjacent to the fuel cell.

8. The fuel cell system of claim 4, wherein
the fuel cell includes a plurality of cells, wherein
the humidification means is inserted between each pair of cells of the plurality of cells, wherein the humidification means includes:
   one or more water channels through which water used for cooling each cell passes; and
   one or more oxidizing-agent channels through which the oxidizing agent passes, wherein
      the water channels face the oxidizing-agent channels with one of an osmotic plate or an osmotic membrane in between.

9. The fuel cell system of claim 3, wherein the oxidizing agent humidified by the humidification means is provided to the mixing means after having been used by the cathode of the fuel cell.

10. A fuel cell system comprising:

a hydrogen production apparatus for generating hydrogen, the hydrogen production apparatus including: humidification means for humidifying a mixture of a hydrocarbon fuel and an oxidizing agent by allowing the mixture to contact with liquid warm water to generate a mixed gas of the hydrocarbon fuel, the oxidizing agent, and steam so that a steam content of the oxidizing agent is close to saturated steam at an operating temperature of the apparatus; and reforming means for allowing the oxidizing agent to partially oxidize the hydrocarbon fuel and allowing the steam to reform the hydrocarbon fuel; and a fuel cell for generating electricity using the hydrogen generated by the hydrogen production apparatus, the fuel cell including at least one cell, wherein each cell is a lamination of an anode and a cathode with an electrolyte membrane in between.

11. The fuel cell system of claim 10, wherein the warm water used by the humidification means is warmed by a heat exchange which occurs in the fuel cell.

12. The fuel cell system of claim 11, wherein the humidification means is thermally integrated with the fuel cell, the humidification means being adjacent to the fuel cell.

13. The fuel cell system of claim 11, wherein the humidification means includes:
   one or more water channels through which the warm water warmed by the heat exchange in the fuel cell passes; and
   one or more mixture channels through which the mixture of the hydrocarbon fuel and the oxidizing agent passes, wherein
      the water channels face the mixture channels with one of an osmotic plate or an osmotic membrane in between.

14. A fuel cell system comprising:

a fuel cell for generating electricity using hydrogen supplied to each anode and using an oxidizing agent supplied to each cathode, the fuel cell including at least one cell, wherein each cell is a lamination of an anode and a cathode with an electrolyte membrane in between; and a hydrogen production apparatus for generating hydrogen and supplying the generated hydrogen to each anode of the fuel cell, the hydrogen production apparatus including: mixing means for mixing the oxidizing agent drained from each cathode of the fuel cell with a hydrocarbon fuel to generate a mixed gas of the hydrocarbon fuel, the oxidizing agent, and steam; and reforming means for allowing the oxidizing agent to partially oxidize the hydrocarbon fuel and allowing the steam to reform the hydrocarbon fuel.

15. A hydrogen production method comprising:

a humidification step for humidifying an oxidizing agent by allowing the oxidizing agent to contact with liquid warm water so that a steam content of the oxidizing agent is close to saturated steam at an operating temperature of the humidification step;

a mixing step for mixing the oxidizing agent humidified in the humidification step with a hydrocarbon fuel to generate a mixed gas of the hydrocarbon fuel, the oxidizing agent, and steam; and a reforming step for allowing the oxidizing agent to partially oxidize the hydrocarbon fuel and allowing the steam to reform the hydrocarbon fuel.

16. A hydrogen production method comprising:

a humidification step for humidifying a mixture of a hydrocarbon fuel and an oxidizing agent by allowing the mixture to contact with liquid warm water to generate a mixed gas of the hydrocarbon fuel, the oxidizing agent, and steam so that a steam content of the oxidizing agent is close to saturated steam at an operating temperature of the humidification step; and a reforming step for allowing the oxidizing agent to partially oxidize the hydrocarbon fuel and allowing the steam to reform the hydrocarbon fuel.

* * * * *